United States Patent
Schroeder et al.

(12) 
(10) Patent No.: US 6,227,461 B1
(45) Date of Patent: May 8, 2001

(54) FLOW NOZZLE FOR INJECTION MOLDING

(76) Inventors: Fred W. Schroeder, 48868 Oriole, Utica, MI (US) 48317; James O. Adas, 15347 Theresa Ct., Clinton, MI (US) 48038

( * ) Notice: Subject to any disclaimer, the term of this patent is extended or adjusted under 35 U.S.C. 154(b) by 0 days.

(21) Appl. No.: 09/435,683

(22) Filed: Nov. 8, 1999

(51) Int. Cl.[7] ....................................................... B05B 1/24
(52) U.S. Cl. .......................... 239/135; 239/132; 239/600; 425/190
(58) Field of Search .................................. 239/135, 132, 239/600; 425/568, 564, 190

(56) References Cited

U.S. PATENT DOCUMENTS

| | | | |
|---|---|---|---|
| 2,529,146 | 11/1950 | Feitl | 18/30 |
| 2,672,187 | * 3/1954 | Smith | 239/600 |
| 4,010,903 | 3/1977 | Sakuri et al. | 239/533.1 |
| 4,266,723 | 5/1981 | Osuna-Diaz | 239/132 |
| 4,468,191 | 8/1984 | Gellert | 425/564 |
| 4,905,901 | * 3/1990 | Johnson | 239/135 |
| 4,969,602 | * 11/1990 | Scholl | 239/135 |
| 5,141,155 | * 8/1992 | Jacobsen | 239/135 |
| 5,484,275 | * 1/1996 | Kushnir | 425/190 |
| 5,573,185 | * 11/1996 | Schwarzkopf | 239/135 |

* cited by examiner

Primary Examiner—David A. Scherbel
Assistant Examiner—Dinh Q. Nguyen
(74) Attorney, Agent, or Firm—Stephen H. Friskney

(57) ABSTRACT

A flow nozzle designed to convey plastic melt from the injection unit of a molding machine to a mold cavity. The flow nozzle includes a nozzle body having a central plastic melt passageway, with a recess at an outermost end to receive a tip member. Positioned around the tip member and the recess of the nozzle body is a seal member made from a deformable material. A compression cap is threadedly carried on the outermost end of the nozzle body and is tightened on the nozzle body to force the seal member against the tip member and the nozzle body recess to provide a seal therebetween.

19 Claims, 3 Drawing Sheets

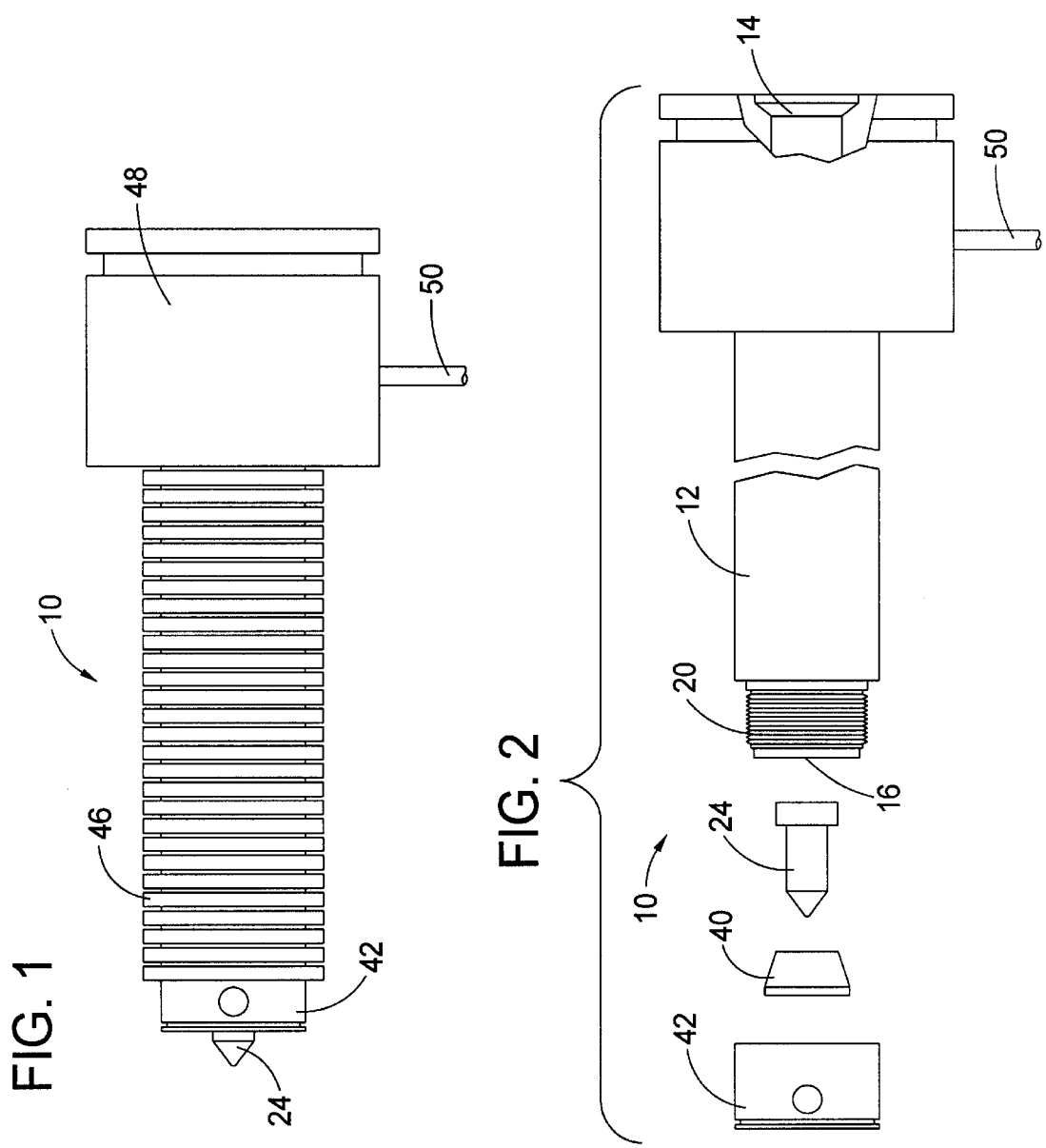

FLOW NOZZLE FOR INJECTION MOLDING

BACKGROUND OF THE INVENTION

1. Field of the Invention

The present invention relates to flow nozzles that are adapted to receive plastic melt from the injection unit of an injection molding machine and direct it into a mold cavity. More particularly, the present invention relates to an improved flow nozzle that includes a sealing member within the flow nozzle for confining the flow of plastic melt to a central passageway within the flow nozzle structure.

2. Description of the Related Art

In the injection molding of thermoplastic materials, a system is provided to convey the plastic melt supplied by the injection unit of the molding machine to the mold cavities. A key element is the injection nozzle, which is in fluid communication with the outlet of the injection unit and mates with the primary gate location (inlet opening) of the mold. The nozzle serves to convey the plastic melt from the outlet of the injection molding machine into the mold cavity, and it generally has an associated heater for maintaining the plastic melt at the desired temperature, thereby optimizing flow properties so that it fills the entirety of the mold cavity. It is particularly important that the nozzle seal effectively in the area adjacent the mold cavity to avoid leakage of plastic melt during the high pressure of injection.

Some flow nozzle structures include threaded connections between a nozzle body and a nozzle tip, which can unintentionally allow passage of some of the plastic melt into the threaded area (leakage), making it difficult to separate the parts of the nozzle for purposes of maintenance or repair. Gaps within the assembled flow nozzle that allow such leakage between parts to occur are often the result of normal manufacturing tolerances of the connected parts, as well as different rates of thermal expansion for the materials used to make the nozzle parts.

Examples of several known injection nozzle structures are disclosed in U.S. Pat. No. 2,529,146, entitled "Injection Molding Apparatus", which issued on Nov. 7, 1950, to R. Feitl; U.S. Pat. No. 4,010,903, entitled "Nozzle For Injection Molding Of Thermal Plastics", which issued on Mar. 8, 1997, to Osamu Sakuri et al.; and U.S. Pat. No. 4,266,723, entitled "Nozzle For Injection Molding Machines", which issued on May 12, 1981, to Jesus M. Osuna-Diaz. Each of the Feitl and Osuna-Diaz patents shows a structure having threaded connections of parts that because of thermal expansion and contraction could result in small gaps into which plastic melt can migrate. The Sakuri et al. nozzle includes an internally-positioned spring for maintaining contact between a needle valve and a surrounding conical cylinder cap, except when it is intended that material flow through the nozzle which, because of pressure differentials, causes the needle to move away from the cylinder cap. However, because of the intended relative movement of the parts, that structure can result in wear over a period of time, generating spaces between parts into which plastic melt can enter.

As described above, prior art nozzle constructions are typically prone to damage and seal degradation over time. In addition, plastic tends to migrate into the threaded areas, resulting in binding of the threads when disassembly for maintenance or repair is attempted. Accordingly, it is an object of the present invention to provide a flow nozzle for injection molding wherein the nozzle structure is such as to prevent the flow of plastic melt into gaps or spaces between adjacent parts. It is another object of the present invention to provide a flow nozzle for injection molding in which compressive forces are provided to maintain contacting parts in close contact, thereby preventing relative movement between the parts and potential leakage of plastic melt between the parts.

SUMMARY OF THE INVENTION

Briefly stated, in accordance with one aspect of the present invention, a flow nozzle is provided to convey the plastic melt supplied by the injection unit of the molding machine to the mold cavities. The flow nozzle includes a nozzle body having a passageway therethrough that extends from a plastic melt inlet to an outlet. The nozzle body has a recess surrounding and communicating with the outlet.

A tip member is part of the nozzle construction and is slidably received within the nozzle body recess adjacent the outlet. The tip member includes a passageway that communicates with the nozzle body passageway at an inlet end of the tip member, and that terminates at an exit end of the tip member at the point of communication with a mold cavity. An annular seal member is provided that surrounds the tip member and is positioned between the tip member and a portion of the nozzle body recess.

A compression cap is provided and is engageable with the outlet end of the nozzle body, the cap having an opening adapted to permit the tip member to extend partially therethrough. Engagement means are provided for connecting the compression cap with the nozzle body and for enabling the application of a compressive force against the annular seal member. The compressive force causes the seal member to tightly contact the cap, the tip member and the nozzle body recess, in a way that confines the flow of plastic melt within the tip member passageway.

BRIEF DESCRIPTION OF THE DRAWINGS

FIG. 1 is a perspective view of a flow nozzle in accordance with the present invention.

FIG. 2 is an exploded view of a portion of the flow nozzle shown in FIG. 1.

DESCRIPTION OF THE PREFERRED EMBODIMENTS

Figure 3:
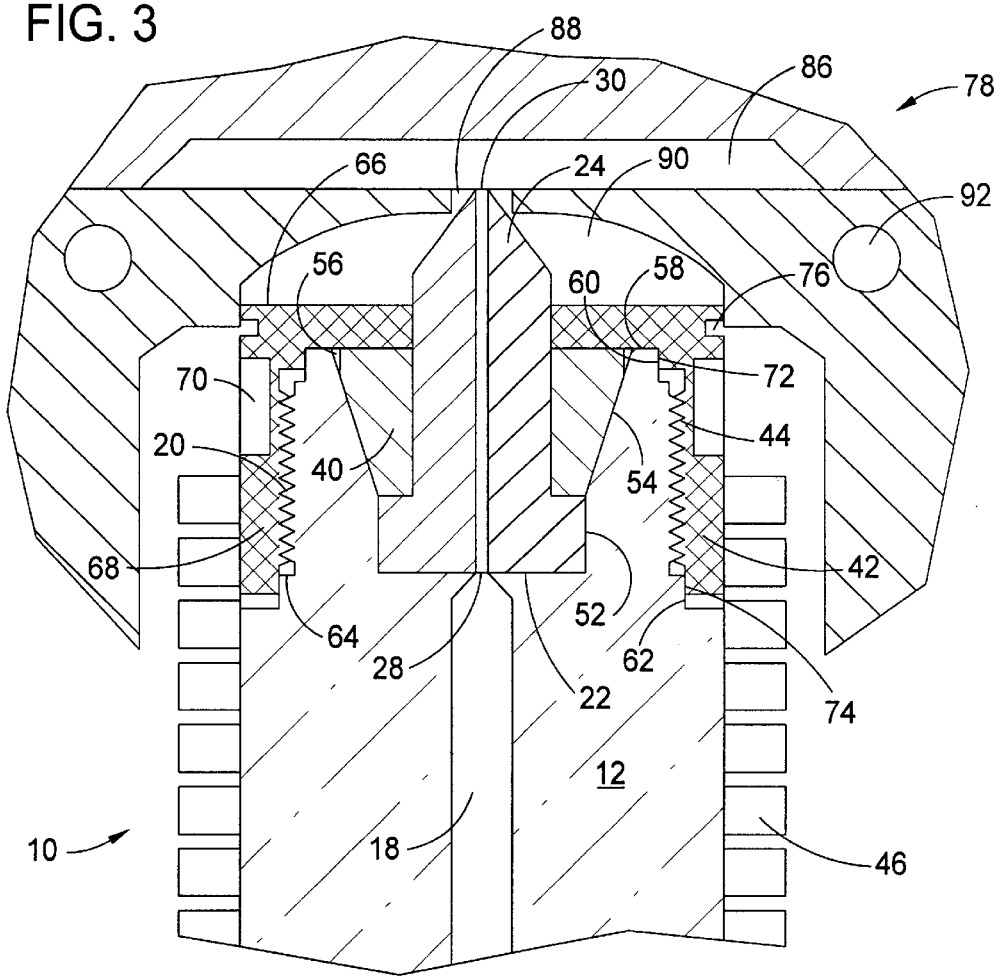
FIG. 3 is a cross-sectional view of the flow nozzle shown in FIGS. 1 and 2 in position adjacent the inlet to a mold cavity.

Referring now to the drawings, and particularly to FIGS. 1 through 3 thereof, there is shown a flow nozzle 10 in accordance with the present invention. Flow nozzle 10 includes a nozzle body 12, preferably formed from stainless steel, H-13 or other suitable material, having a plastic melt inlet 14 and an outlet 16. A plastic melt passageway 18 extends axially through nozzle body 12 and interconnects the inlet 14 with the outlet 16. An external thread 20 is provided on nozzle body 12 adjacent the plastic melt outlet 16, and an enlarged recess 22, concentric with the outlet 16, is adapted to receive a tip member 24.

Figure 5:
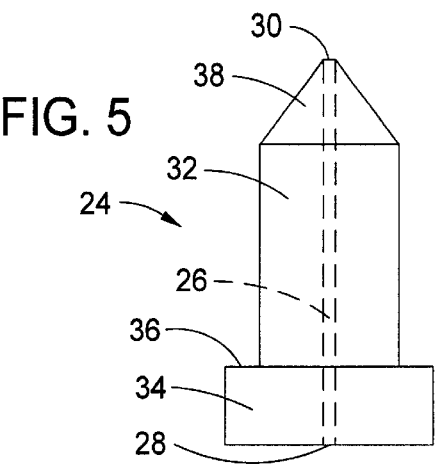
FIG. 5 is a perspective view of a tip member of the type shown in FIGS. 1 through 3.

As shown in FIGS. 3 and 5, tip member 24 includes an axial passageway 26 that extends from an inlet 28 to an outlet 30 through which plastic melt is conveyed. Tip member 24 is preferably made from a beryllium-copper alloy for good heat transfer, and has a cylindrical body 32 with an enlarged cylindrical end 34 adjacent to material inlet 28 to define a laterally extending step 36. Cylindrical end 34 of tip member 24 is adapted to be received within recess 22 formed in nozzle body 12. Tip member 24 also has a generally conical outer end 38 adjacent to melt outlet 30. Outlet 30 can be a unitary opening, or it can be defined by a plurality of openings spaced about the outer surface of outer end 38, to provide for more uniform lateral distribution of plastic melt, as generally known in the art.

A seal member 40 encircles the body 32 of tip member 24 and is also at least partially received within the recess 22 formed in nozzle body 12. Additionally, a compression cap 42 that overlies tip member 24 and seal member 40 includes internal threads 44 sized to engage with the external threads 20 of nozzle body 12.

As shown in FIG. 1, the assembled flow nozzle 10 includes an external, electrical resistance heater 46 that, as shown, is of helical form and extends around and along substantially the entire length of nozzle body 12. In its preferred form, resistance heater 46 is a continuous helical coil that is formed from a heating element that has a generally rectangular cross section. Resistance heater 46 terminates adjacent the enlarged end 48 of nozzle body 12 and connects with a cable 50 that extends for connection with a source of electrical power. Although shown as helical in form, the resistance heater can be of several other forms, as will be appreciated by those skilled in the art. For example, the resistance heater can be a series of longitudinally extending rods that surround nozzle body 12, or it can be a solid tubular structure, or the like.

The arrangement of the several parts of flow nozzle 10 in its assembled form is best seen in FIG. 3. As shown, enlarged end 34 of tip member 24 is snugly received in recess 22 provided at the outlet end of nozzle body 12. Recess 22 includes a cylindrical inner portion 52 having a diameter concentric with and greater than the diameter of passageway 18; it also includes a concentric frustoconical portion 54 that flares axially and outwardly in a direction toward the outlet end of nozzle body 12.

The outermost end 58 of nozzle body 12 adjacent outlet 16 is preferably flat and defines an annular sealing surface that surrounds recess 22. The outermost edge at the end 58 of the nozzle body 12 defines a first compression cap alignment surface 60 that is spaced outwardly from external thread 20. A second compression cap alignment surface 62 is formed on the other side of external thread 20 inwardly of the outer surface of nozzle body 12 to define a step 64. The surfaces 60, 62 ensure that compression cap 42 is concentric with the nozzle body 12, as is more fully described below.

Although shown as cylindrical in form, nozzle body 12 can be of any desired form, so long as it includes a flow passageway and a recess for receiving the tip member. Preferably, nozzle body 12 is made from stainless steel, although it can also be formed from other suitable materials.

Compression cap 42 is threadedly received on thread 20 of nozzle body 12 at the outlet end thereof. Compression cap 42 includes a top wall 66 and a skirt 68 that depends from top wall 66 and that includes an internal thread 44 adapted to engage with external thread 20 on nozzle body 12. Additionally, compression cap 42 includes a first, inner alignment ring 72 that is adapted to engage with first alignment surface 60 on nozzle body 12, and a second, inner alignment ring 74 that is adapted to engage with second alignment surface 62 on nozzle body 12. The respective alignment rings and alignment surfaces facilitate the proper positioning of compression cap 42 so that it is concentric with nozzle body 12.

One or more recesses 70 are provided on the outer side surface of skirt 68 to receive the pin of a spanner wrench (not shown) to enable compression cap 42 to be tightly threaded onto nozzle body 12 and also to enable the cap to be removed therefrom. Additionally, adjacent to its outwardly facing end surface 58, compression cap 42 includes an annular recess 76.

As shown in FIG. 3, enlarged end 34 of tip member 24 is received in the correspondingly shaped enlarged recess 22 of nozzle body 12. Preferably, the fit between those elements is a close fit to minimize the likelihood of leakage of plastic melt therebetween. Additionally, passageway 26 within tip member 24 is so positioned that it is aligned with passageway 18 of nozzle body 12 to permit smooth, unimpeded flow of plastic melt through nozzle body 12 and through tip member 24 to outlet 30 at the outermost end of tip member 24. Preferably, tip member 24 is made from a beryllium-copper alloy for good heat transfer. Additionally, the tip member can be nickel plated to provide surface hardness.

Figure 4:
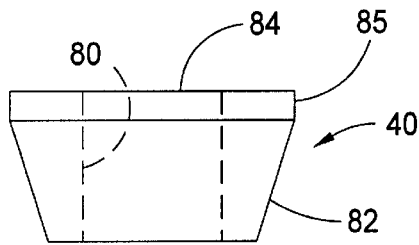
FIG. 4 is a perspective view of a seal member forming part of the flow nozzle shown in FIGS. 1 through 3.

As best seen in FIG. 4, seal member 40 is preferably in the form of a ring-like element that includes a central through bore 80 that corresponds in diameter with the outer diameter of cylindrical body 32 of tip member 24. Additionally, seal member 40 preferably includes a tapered, frustoconical region 82 to allow it to be received within and to engage with the surface of frustoconical surface 54 within recess 22 in nozzle body 12. A short, concentric cylindrical outer portion 85 completes the outer geometry. Preferably, seal member 40 has an axial length that is somewhat greater than the combined axial length of portions 54 and 56 of recess 22 so that a portion of seal member 40 extends outwardly from recess 22 (past surface 58) when the seal member is positioned therewithin as shown in FIG. 3. In this regard, seal member 40 can extend outwardly of recess 22 from about 0.005 in. to about 0.010 in. to facilitate compression, as more fully described below.

Seal member 40 can advantageously be formed from a material that is softer than that of tip member 24 and also that is softer than that of nozzle body 12. Accordingly, when seal member 40 is in positioned within recess 22 and compression cap 42 is threaded onto nozzle body 12 and is tightened down, the cap 42 imposes a compressive force on seal member 40 to cause it to deform somewhat, to conform closely with the shapes of the several surfaces defining recess 22, and also to closely conform with the shape of the outer surface of cylindrical body 32 of tip member 24, to provide a tight seal between each of those elements. Depending on the material and compressive force, the seal member 40 may be deformed into an annular gap 56 between the recess 22 and seal member 40. When in its assembled form as shown in FIG. 3, the inner surface of top wall 66 of compression cap 42 bears against the larger diameter outer end 84 of seal member 40, to impart compressive forces thereto, which causes the desired deformation to occur and the desired seal to be effected between the contacting surfaces.

FIG. 3 shows flow nozzle 10 in its operative position relative to a mold 78 that defines a mold cavity 86 that corresponds with the shape of an article to be molded. Mold cavity 86 includes an opening or gate 88 through which the plastic melt passes after it flows from material outlet 30 of tip member 24. Additionally, open area 90 immediately outwardly of the gate defines a plastic melt collection area to ensure complete filling of the mold cavity with the plastic melt. Optionally, passageways 92 can be provided in one or more portions of the mold to enable the circulation of fluid through the walls of the mold to maintain the mold at a desired temperature.

Figure 6:
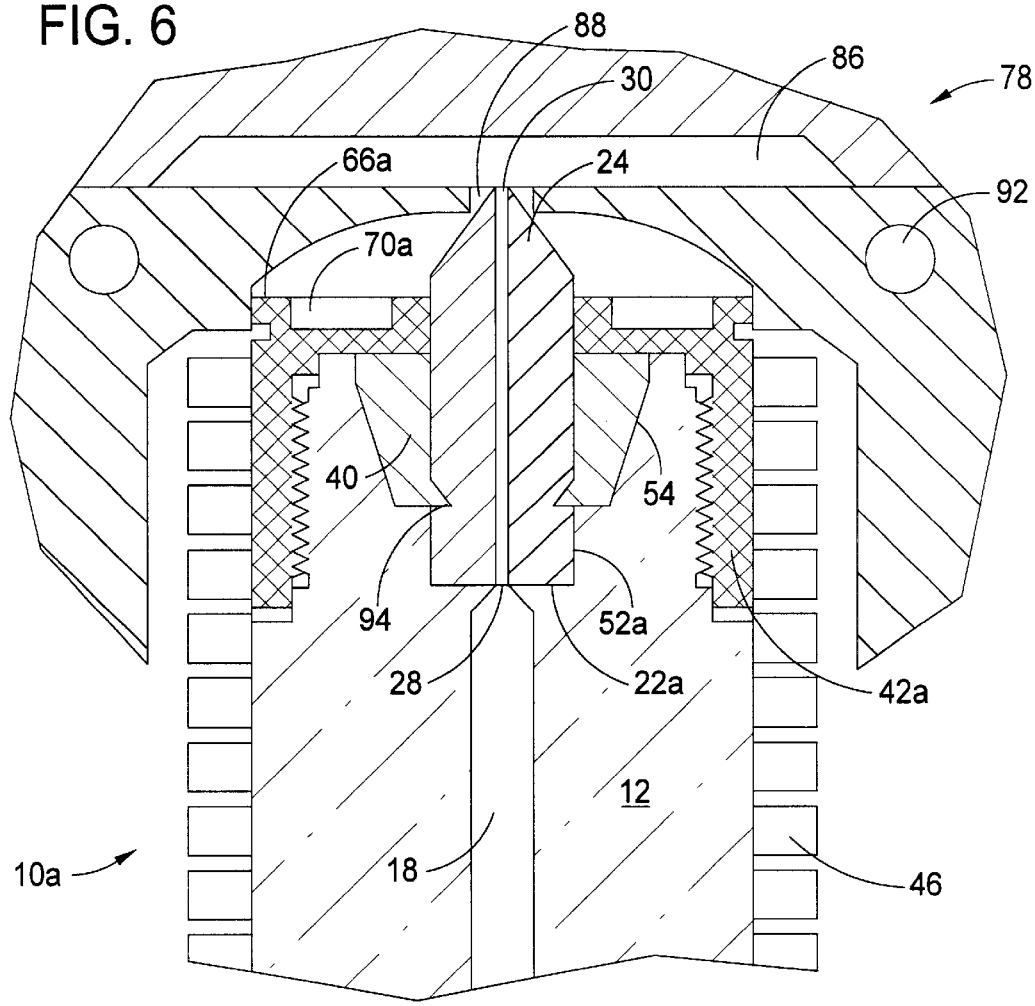
FIG. 6 is a cross-sectional view similar to that of FIG. 3, but showing an alternative embodiment of a tip member used in conjunction with the present invention.
Figure 7:
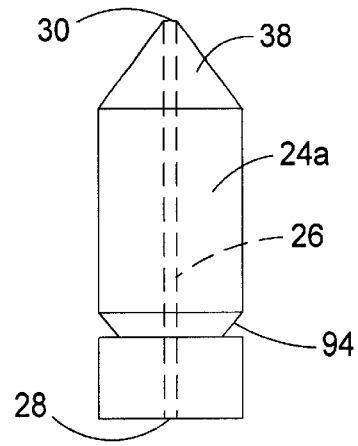
FIG. 7 is a perspective view of the alternative tip member employed with the flow nozzle structure shown in FIG. 6.

An alternative embodiment of a flow nozzle in accordance with the present invention is shown in FIG. 6. That embodiment is structurally similar in most respects to the embodiment shown in FIG. 3 except that tip member 24*a* of FIG. 6 has a uniform cylindrical outer surface along its entire length, without an enlarged end as in tip member 24 of FIG. 3, and the geometry of recess 22*a* matches the outer geometry of tip member 24*a* and seal member 40, as shown. Additionally, as best seen in FIG. 7, tip member 24*a* also includes an external annular groove 94 at a position between inlet 28 and outlet 30 of tip member 24*a*.

In the operation of the FIG. 6 embodiment, upon compression of seal member 40 during application and tightening of compression cap 42, the softer material from which seal member 40 is made partially flows into annular groove 94 to provide a substantially fluid-tight seal between seal member 40 and tip member 24*a*. Preferably, the groove 94 generally aligns with the shoulder formed where the cylindrical portion 52*a* of recess 22*a* changes to the frustoconical portion 54. This configuration allows the small diameter inner end of seal member 40 to be displaced into the groove 94 when the cap 42*a* is tightened. Moreover, although shown as of generally V-shaped form in cross section, annular groove 94 can be of any desired cross-sectional form, including square, semicircular, and the like.

Another variation in the structure of flow nozzle 10*a* as shown in FIG. 6, as compared with flow nozzle 10 of FIG. 3, resides in the form of compression cap 42*a*. In that regard, the external recesses 70*a* carried by the compression cap for receiving the pin of a spanner wrench for applying and removing the compression cap are provided in top wall 66*a*, rather than in the side wall as in the FIG. 3 embodiment, to enable removal of compression cap 42*a* from flow nozzle 10*a* without the necessity for removing resistance heater 46.

Although particular embodiments of the present invention have been illustrated and described, it will be apparent to those skilled in the art that changes in modifications can be made without departing from the concepts of the present invention. For example, the specific geometries of recess 22, tip member 24, seal member 40 and compression cap 42 can be varied to emulate other compression fitting seal techniques known in the art. Accordingly, it is intended to encompass within the appended claims all such changes and modifications that fall within the scope of the present invention.

What is claimed is:

1. A flow nozzle for conveying plastic melt to a mold cavity, said nozzle comprising:

(a) a nozzle body having a passageway extending therethrough from a plastic melt inlet to a plastic melt outlet, the nozzle body including a recess surrounding and communicating with the plastic melt outlet;

(b) a tip member slidably received within the recess, the tip member including a passageway that communicates with the nozzle body passageway at a first end of the tip member and that terminates at a second end of the tip member for communication with a mold cavity;

(c) an annular seal member surrounding the tip member and positioned within the nozzle body recess; and (d) a compression cap engageable with the nozzle body adjacent the plastic melt outlet, the compression cap having an opening adapted to permit the tip member to extend at least partially therethrough and including engagement means for connecting the compression cap with the nozzle body and for applying a compressive force against the annular seal member to cause the seal member to tightly engage the tip member and the nozzle body recess, establishing direct contact between the seal member and each of the tip member, nozzle body recess and compression cap to retain the tip member and to confine the flow of plastic melt from the nozzle body passageway to the tip member passageway.

2. A flow nozzle in accordance with claim 1, wherein the nozzle body recess includes a frustoconical surface.

3. A flow nozzle in accordance with claim 1, wherein the seal member includes a frustoconical outer surface.

4. A flow nozzle in accordance with claim 1, wherein the seal member is deformable.

5. A flow nozzle in accordance with claim 1, wherein the seal member has a compressive strength lower than that of the nozzle body and lower than that of the tip member.

6. A flow nozzle in accordance with claim 1, wherein the tip member has an enlarged area that is received within the nozzle body recess and that defines an outwardly-extending shoulder.

7. A flow nozzle in accordance with claim 6, wherein the seal member is in contacting engagement with the tip member shoulder.

8. A flow nozzle in accordance with claim 1, wherein the tip member includes an external annular recess that faces and engages the seal member.

9. A flow nozzle in accordance with claim 8, wherein the recess has a V-shaped cross section.

10. A flow nozzle in accordance with claim 1, wherein the compression cap is removably received on the nozzle body.

11. A flow nozzle in accordance with claim 10, wherein the compression cap is threadedly received on the nozzle body.

12. A flow nozzle in accordance with claim 11, wherein the cap includes at least one external recess for receiving a tool for tightening and loosening the compression cap relative to the nozzle body.

13. A flow nozzle in accordance with claim 12, wherein the at least one external recess is positioned on a side wall of the compression cap.

14. A flow nozzle in accordance with claim 12, wherein the at least one external recess is positioned on an end wall of the compression cap.

15. A flow nozzle in accordance with claim 1 including heating means external to the nozzle body for maintaining the flow nozzle at a predetermined temperature.

16. A flow nozzle in accordance with claim 15, wherein the heating means is carried by the nozzle body.

17. A flow nozzle in accordance with claim 16, wherein the heating means surrounds the nozzle body.

18. A flow nozzle in accordance with claim 17, wherein the heating means is a helical coil.

19. A flow nozzle in accordance with claim 5, wherein the heating means is a resistance heating element.

\* \* \* \* \*